United States Patent
Pai et al.

(10) Patent No.: US 11,440,377 B2
(45) Date of Patent: Sep. 13, 2022

(54) AIR REGISTER HAVING A VANE LINKING MEMBER COUPLED TO A GROMMET FOR USE IN EFFORT GENERATION

(71) Applicant: Ford Global Technologies, LLC, Dearborn, MI (US)

(72) Inventors: Prashanth Ganapathi Pai, Dearborn Heights, MI (US); Steven Nicholas Fidh, Ann Arbor, MI (US); John Robert Tresh, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 16/878,284

(22) Filed: May 19, 2020

(65) Prior Publication Data

US 2021/0362568 A1 Nov. 25, 2021

(51) Int. Cl.
*B60H 1/34* (2006.01)

(52) U.S. Cl.
CPC ............ *B60H 1/3421* (2013.01); *B60H 2001/3464* (2013.01)

(58) Field of Classification Search
CPC ............ B60H 1/3421; B60H 1/3414; B60H 2001/3464; B60H 2001/3492
USPC ................................. 454/154, 155
See application file for complete search history.

(56) References Cited

U.S. PATENT DOCUMENTS

| | | | | |
|---|---|---|---|---|
| 5,470,276 A | * | 11/1995 | Burnell | F24F 13/075 454/319 |
| 7,997,964 B2 | * | 8/2011 | Gehring | B60H 1/345 454/155 |
| 10,792,981 B2 | * | 10/2020 | Lee | B60H 1/3421 |
| 2004/0002298 A1 | * | 1/2004 | Osada | B60H 1/3421 454/155 |
| 2004/0170469 A1 | * | 9/2004 | Ochiai | F16B 21/073 403/122 |
| 2006/0063480 A1 | | 3/2006 | Neumann et al. | |
| 2016/0009163 A1 | * | 1/2016 | Terai | B60H 1/3421 454/155 |
| 2018/0022193 A1 | * | 1/2018 | Lin | B23P 19/04 454/155 |

FOREIGN PATENT DOCUMENTS

| | | |
|---|---|---|
| CN | 205468432 U | 8/2016 |
| CN | 205615300 U | 10/2016 |
| DE | 19745871 A1 | 4/1999 |
| KR | 101763671 B1 | 8/2017 |

* cited by examiner

*Primary Examiner* — Avinash A Savani
*Assistant Examiner* — Dana K Tighe
(74) *Attorney, Agent, or Firm* — Vichit Chea; Price Heneveld LLP (57) ABSTRACT

An air register having a plurality of pivotable vanes, including at least two horizontal vanes, each horizontal vane having an outer section and an inner section, and a linking member connecting the inner sections together. The outer sections of the horizontal vanes are each pivotably connected to a housing of the air register, and at least one of the inner sections includes an inner pivot pin connected to a annular grommet, which is in turn, connected to the linking member. The annular grommet is disposed within a cavity of the linking member and contributes to generating effort felt by a user when adjusting a pivot position of the horizontal vanes.

17 Claims, 6 Drawing Sheets

AIR REGISTER HAVING A VANE LINKING MEMBER COUPLED TO A GROMMET FOR USE IN EFFORT GENERATION

TECHNICAL FIELD

The present disclosure relates to pivot movement for vanes in an air register, and in particular, generating effort for vane movement by use of a grommet in a vane linking member of the air register.

BACKGROUND

Air registers in motor vehicles are commonly provided with adjustable vanes. The vanes are typically pivotably connected, directly or indirectly, to a housing of the air register, and can be adjusted (e.g., pivoted) by a user to influence air flow rate and fluid path for air that enters a passenger cabin of the motor vehicle through the air register.

The air register can be provided with a control knob that can be used to adjust the pivot position of the vanes. The effort required by a user to manually move the knob for controlling the vanes can influence the quality feel of the air register and vehicle, and the effort is typically a function of an interference fit between the pivot pins of the vanes and a retainer of the air register to which the pins are connected. To achieve an appropriate interference fit between vane pins and the retainer for generating effort required to move the vanes, the tooling for manufacturing the retainer related components must be tuned within tight tolerance levels, and the finely tuned fit must be maintained.

In addition to the quality feel provided by appropriate effort generation due to interference fit, movement resistance in a vane assembly of the air register is also desired for balance. That is, for example, it is sometimes a design preference to situate a horizontal pivot axes of horizontal vanes at locations near outer sections of the vanes (i.e., closer to a passenger cabin, as opposed to locations on the vanes that are deeper within the air register), so that when the horizontal vanes are pivoted about the horizontal pivot axes, the passenger facing edges of the vanes remain substantially stationary, while inner sections of the vanes, which are deeper within the air register (forward in the vehicle) are displaced upward or downward. This can reflect a preferred design aesthetic for some vehicles. However, the alignment of the horizontal pivot axes on an outer sections of the vanes also results in the vanes being balanced towards a forward side of the vehicle. That is, the forward sides of the horizontal vanes may tend to drop downward about the horizontal pivot axes when the vehicle hits a bumpy surface during movement, or when the vanes are exposed to high heat in air passing through the air register.

BRIEF SUMMARY

In some embodiments of the present disclosure, an assembly associated with an air register includes a plurality of adjustable vanes for which pivot angles can be adjusted to influence air flow direction and air flow rate. A plurality of vanes can be linked together by a linking member, in addition to being pivotably connected to a housing of the air register. At least one, or a single one, of the pivot pins linking the vanes to the linking member, can be disposed within an elastic (e.g., silicone rubber) grommet, which is in turn, disposed in a cavity of the linking member under compression, for generating effort associated with pivoting the vanes. The effort generation can improve the quality feel experienced by a user when adjusting the vanes, and can also provide resistance to help prevent the vanes from spontaneously pivoting due to weight imbalance between an outer and inner (rearward and forward) section of the vanes. Moreover, the grommet reduces the requirement for finely tuned interference fits between the vane pins and retainer of the air register, since the elasticity of the grommet allows it be compressed and exert resistance/effort in response to the compression.

In some embodiments, an air register is positioned on a vehicle dashboard, and the air register includes at least two or more horizontal vanes, with each horizontal vane having an outer section with an outer edge that is substantially aligned with an outer edge surface of an adjacent bezel of the vehicle dashboard. The horizontal vanes are pivotably connected to a housing of the air register for pivot movement about outer longitudinal pivot axes of the horizontal vanes, and the outer longitudinal pivot axes are positioned at sufficiently outer locations (nearer the passenger cabin, rather than deeper in the air register) so that when the vanes are pivoted up to 45 degrees, or more in some embodiments, from a horizontal orientation, the outer edge of the horizontal vanes remain substantially aligned with the outer edge surface of the adjacent bezel, and the positions of the outer longitudinal axes are counter-balanced by use of a grommet in a connecting linking member of the horizontal vanes. That is, the grommet provides resistance against spontaneous pivot movement of the horizontal vanes that could otherwise occur due to weight imbalance created by the unsupported inner sections of the vanes.

A method according to an exemplary embodiment of the present disclosure for assembling an air register includes pivotably connecting a plurality of horizontal vanes to an air register housing in a manner to permit each of the plurality of horizontal vanes to pivot about an outer pivot axis that extends longitudinally across the horizontal vane, at an outer section of the horizontal vane. The method also includes linking an inner section of each of plurality of horizontal vanes together using a shared linking member by pivotably connecting a first inner pivot pin of at least one of the horizontal vanes to an annular grommet, and to the linking member, and pivotably connecting a second inner pivot pin of at least one of the horizontal vanes to the linking member. The linking member is free to move transversely relative to the outer pivot axes in response to the horizontal vanes being pivoted about the outer pivot axes, while the annular grommet associated with the linking member and first inner pivot pin, creates resistance to pivot movement of the horizontal vanes, thereby generating effort.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with motor vehicles, air registers, and dashboard components of motor vehicles, have not been shown or described in detail to avoid unnecessarily obscuring descriptions of the embodiments.

In the following description, certain specific details are set forth in order to provide a thorough understanding of various disclosed examples. However, one skilled in the relevant art will recognize that examples may be practiced without one or more of these specific details, or with other methods, components, materials, etc.

Figure 1:
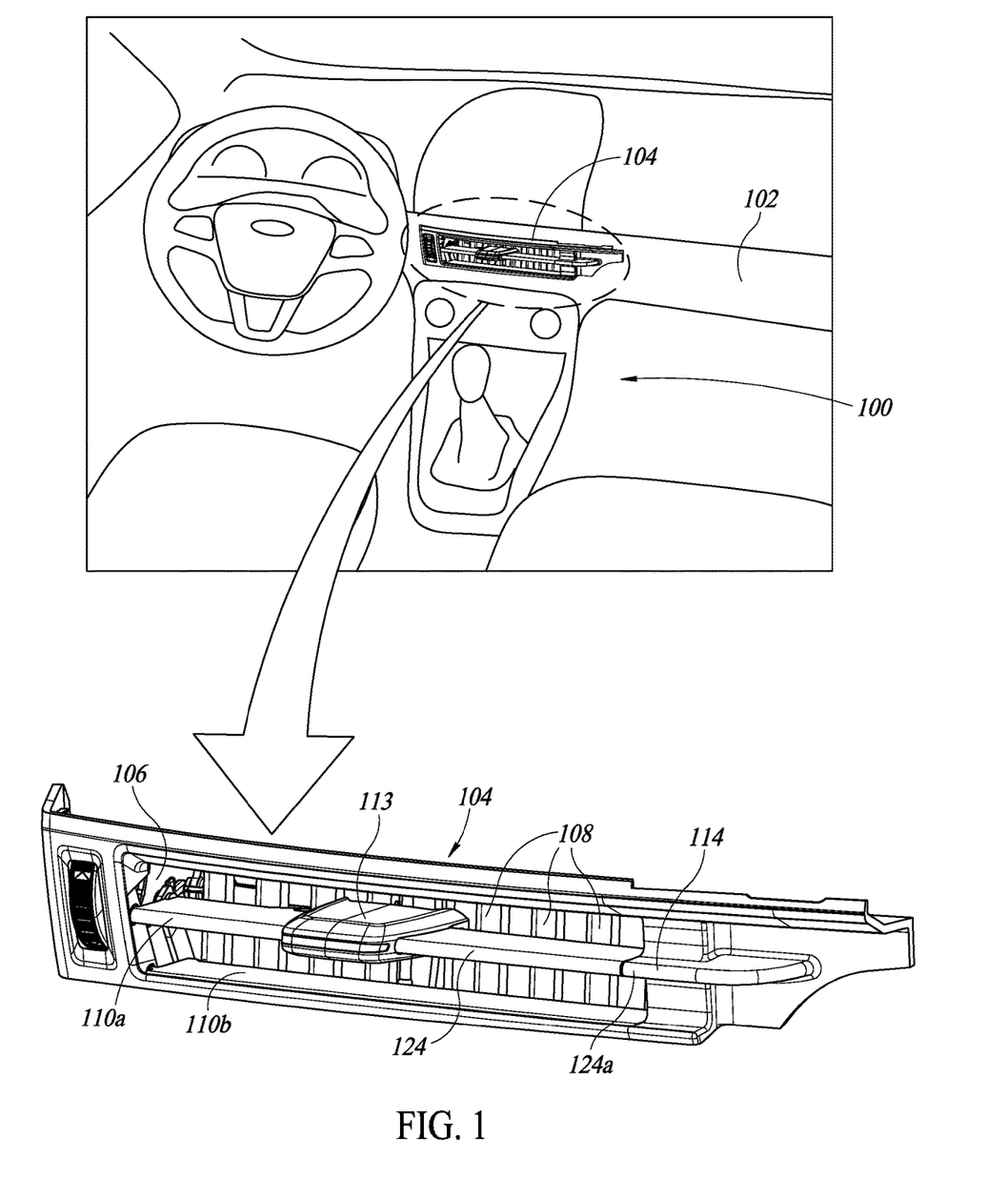
FIG. 1 is a partial perspective view of a motor vehicle passenger cabin with dashboard and air register, and an enlarged partial perspective view of a passenger facing portion of the air register, for some embodiments of the present disclosure.
Figure 2A:
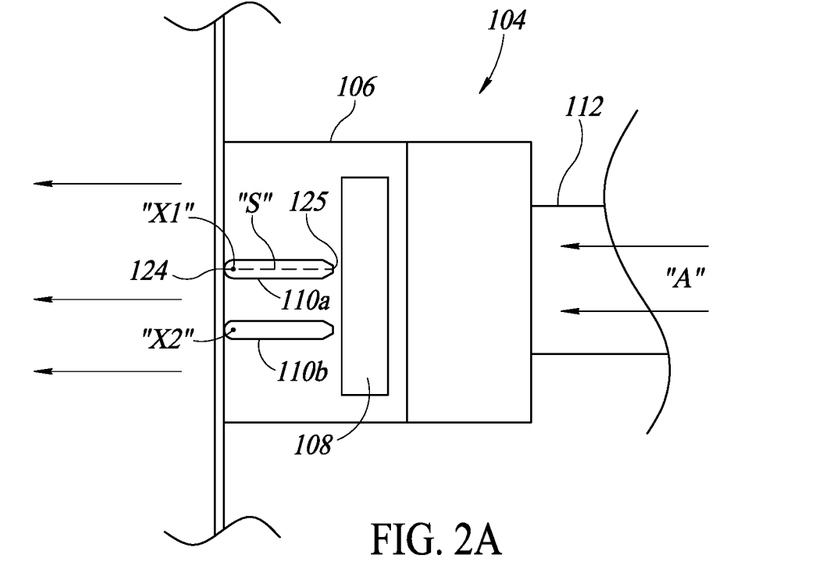
FIGS. 2a and 2b are simplified cross-sectional side elevation views of the air register of FIG. 1, as operated in connection with a vehicle air duct, illustrating pivot movement of the horizontal vanes, according to some embodiments of the present disclosure.
Figure 2B:
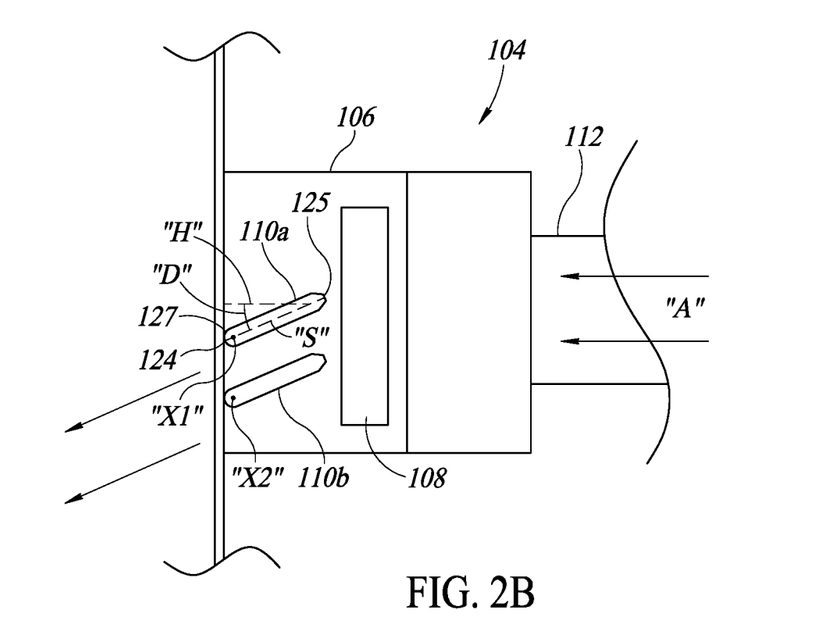

Referring to FIGS. 1, 2a, and 2b, an air register 104 is positioned adjacent a vehicle dashboard 102. The air register 104 is configured to provide a passageway for, and control of, airflow from an air duct 112 of a vehicle heating, ventilation, and air conditioning ("HVAC") unit or a blower (not illustrated), to a vehicle interior passenger cabin 100. The air register 104 includes a housing 106, a plurality of vertical vanes 108, and a plurality of horizontal vanes 110a, 110b. In the illustrated embodiment in FIG. 1, at least one of the horizontal vanes 110a has an outer edge 124 that is aligned with an outer edge 124a, of a bezel 114 of the vehicle dashboard 102.

In some embodiments, the vertical vanes 108, are pivotably connected, directly or indirectly, to the housing 106 of the air register 104, in a manner to allow the vertical vanes 108 to pivot about a vertical axis when adjusted by an operator. Also, the horizontal vanes 110a, 110b, of the air register 104 are aligned in generally perpendicular orientation relative to the plurality of vertical vanes 108, and are pivotably connected to the housing 106, and can also be pivotably adjusted to influence direction and rate of airflow from the air duct 12 to the passenger cabin 100. For example, as can be seen in FIGS. 2a and 2b, the horizontal vanes 110a, 110b, may be pivotably adjusted in order to direct the airflow "A." FIGS. 2a and 2b are not intended to be limiting, and the horizontal vanes 110a, 110b, may also be pivoted to adjusted airflow "A" in directions other than illustrated, and to a greater or lesser extent than the angle "D" illustrated, relative to a horizontal position "H," as will be appreciated by those skilled in the art upon reviewing the present disclosure. Moreover, in alternative embodiments of the present disclosure, a different number of horizontal vanes 110a, 110b, or vertical vanes 108 can be provided, other than as illustrated in FIGS. 1, 2a, and 2b.

As best seen in FIG. 1, an adjustment knob 113 is connected to the horizontal vanes 110a, 110b, for use by a vehicle passenger or operator, for gripping the knob 113 to adjust pivot position of the horizontal vanes 110a, 110b. The knob 113 can also be connected to the vertical vanes 108, such that it can be used to adjust a pivot position of the vertical vanes 108, relative to a vertical pivot axis (not shown), as well as a pivot position of the horizontal vanes 110a, 110b, relative to horizontal pivot axes, as will be discussed in further detail below.

Figure 3:
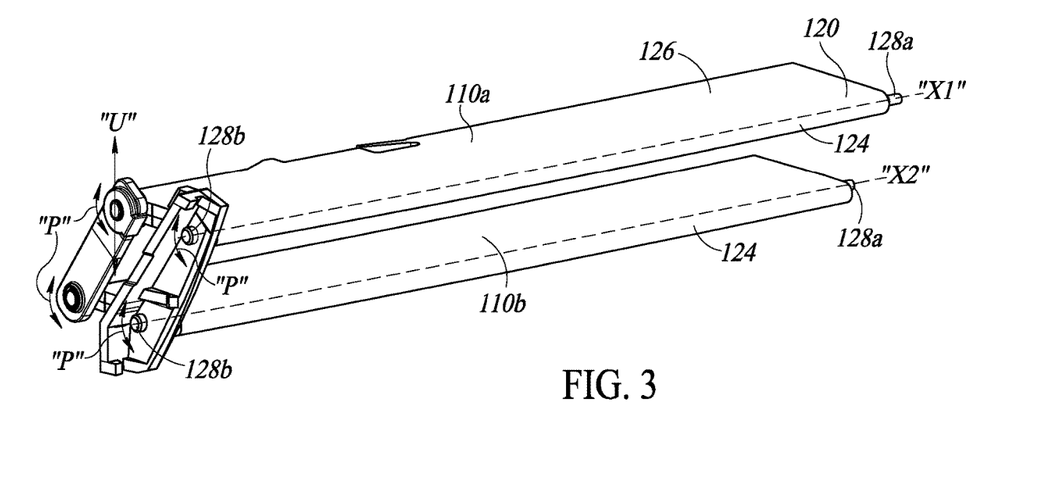
FIG. 3 is a front perspective view of the horizontal vanes of the air register of FIG. 1, also showing a linking member and retainer.
Figure 5:
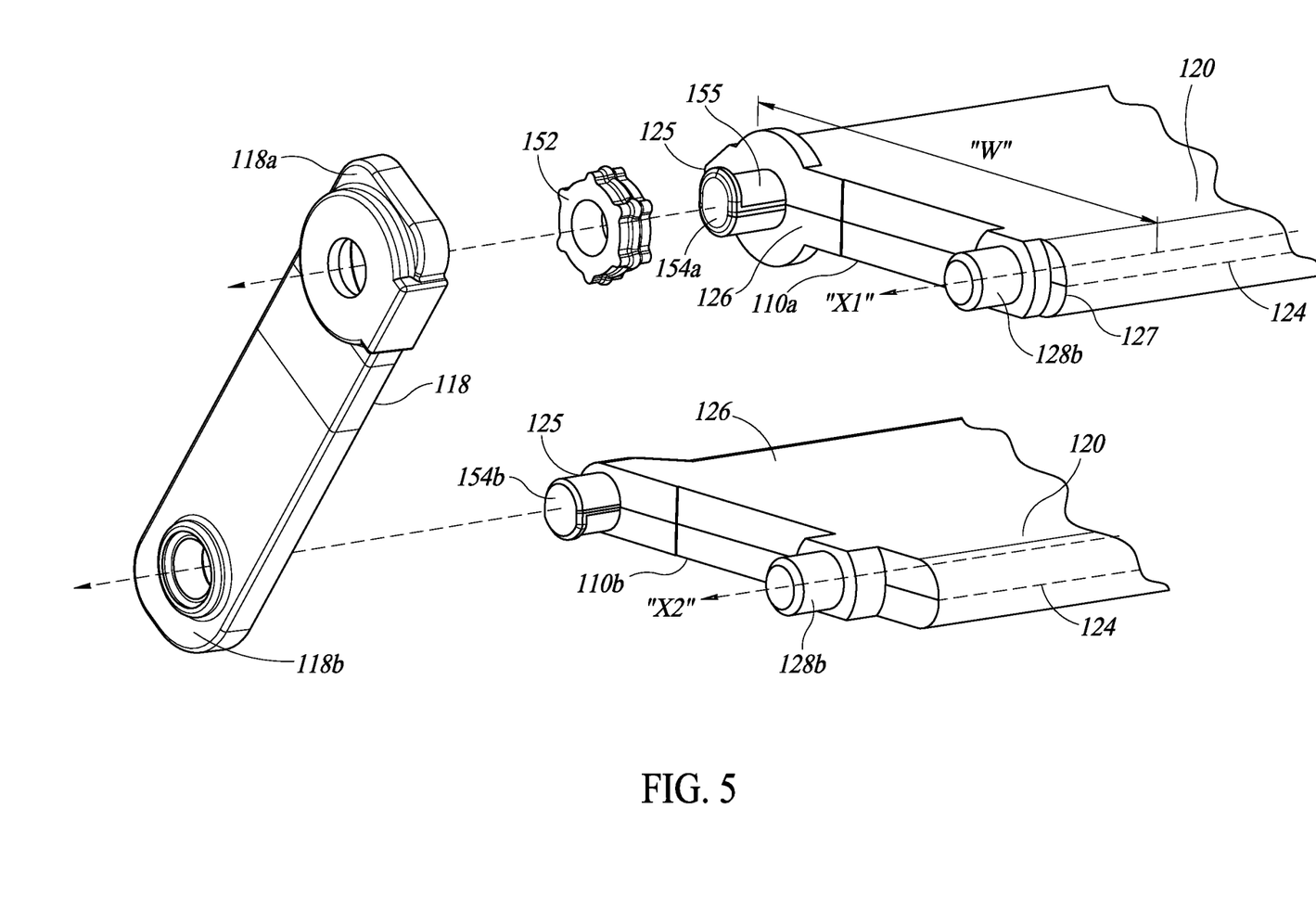
FIG. 5 is an exploded partial perspective view of the horizontal vanes and linking member of FIG. 3, also showing an annular grommet for some embodiments of the present disclosure.

Referring to FIGS. 3 and 5, each horizontal vane 110a, 110b, of the air register 104 can include an outer section 120 that has an outer edge 124, an inner section 126 having inner edge 125, and a longitudinal pivot axis X1, X2, which extends longitudinally across the horizontal vane 110a, 110b. In some embodiments, the longitudinal pivot axes X1, X2, are outer longitudinal pivot axes, and extend longitudinally across the outer sections 120 of the horizontal vanes 110a, 110b. The outer sections 120 and outer edges 124 of the horizontal vanes 110a, 110b, are nearest to the passenger cabin 100, relative to the opposite, inner sections 126 and inner edges 125 of the horizontal vanes 110a, 110b. That is, the inner section 126 with inner edge 125, of each horizontal vane 110a, 110b, are positioned deeper within the housing 106 of the air register 104, than the outer section 120 with outer edge 124. See, e.g., FIGS. 2a and 2b. Also, the inner sections 126 with inner edges 125 are positioned forward of the outer sections 120 with outer edges 124, by being nearer to a front end of a motor vehicle in which the air register 104 is disposed.

Also, each horizontal vane 110a, 110b can be pivotably connected to the housing 106 of the air register 104 via outer pivot pins 128a, 128b, that are disposed on opposite sides of the horizontal vanes 110a, 110b, and axially aligned with the outer longitudinal pivot axes X1, X2. In some embodiments, the outer pivot pins 128b on a first side of the horizontal vanes 110a, 110b, are pivotably connected to housing 106, by being pivotably connected to a retainer 132, which is in turn, fixedly attached to the housing 106 of the air register 104. In the illustrated embodiments, the outer sections 120 of the horizontal vanes 110a, 110b, are pivotably fixed to the housing 106 in a manner to prevent transverse movement of horizontal vanes relative to the housing 106, while permitting the horizontal vanes 110a, 110b, to pivot freely about the outer longitudinal pivot axes X1, X2.

In some embodiments, the retainer 132 structure is formed as a vertically extending member relative to the housing 106, and the retainer 132 is fixedly attached to the housing 106, with receiving apertures for receiving, and pivotably retaining, the outer pivot pins 128b of the horizontal vanes 110a, 110b.

Referring to FIGS. 2b and 5, the outer edge 124 of at least one of the horizontal vanes 110a (which can be an outermost edge line extending across an outer facing side of the horizontal vane), can extend longitudinally in bisecting fashion along a vertically rounded edge surface 127. Also, the outer longitudinal pivot axis X1 of the horizontal vane 110a may be axially centered at, or near, a radius center of the rounded edge surface 127. As such, when the horizontal vane 110a is pivoted about the outer longitudinal pivot axis X1, as best seen in FIG. 2b, from a horizontal position "H,"

to a pivot angle "D" (with angle "D" being measured between a widthwise horizontal plane "H," and a pivoted plane "S" of the horizontal vane 110a) the location of the outer edge 124 can remain substantially stationary, so as to remain in alignment with a stationary surface edge of the dashboard of the vehicle, such as, for example, an outer edge 124a of bezel 114 of the vehicle dashboard 102. See, e.g., FIG. 1. In some embodiments, when the horizontal vane 110a is pivoted about the outer longitudinal pivot axis X1 by up to D=30 degrees, D=40 degrees or D=60 degrees, upward or downward from the horizontal position "H" shown, the outer edge 124 may remain substantially aligned with the bezel 114 edge 124a, or otherwise, be displaced less than 5%, or 2.5%, of a full width "W," or depth, of the horizontal vane 110a, in any direction (forward, rearward, upward or downward). The position of the outer longitudinal pivot axis X1 (e.g., axially centered at, or near, the radius center of a rounded edge surface 27) largely contributes to maintaining this substantial alignment through pivoting of the horizontal vane 110a. Such position of the outer longitudinal pivot axis X1, may be referred to herein as a "true front pivot" or "true outer pivot," position.

Figure 4:
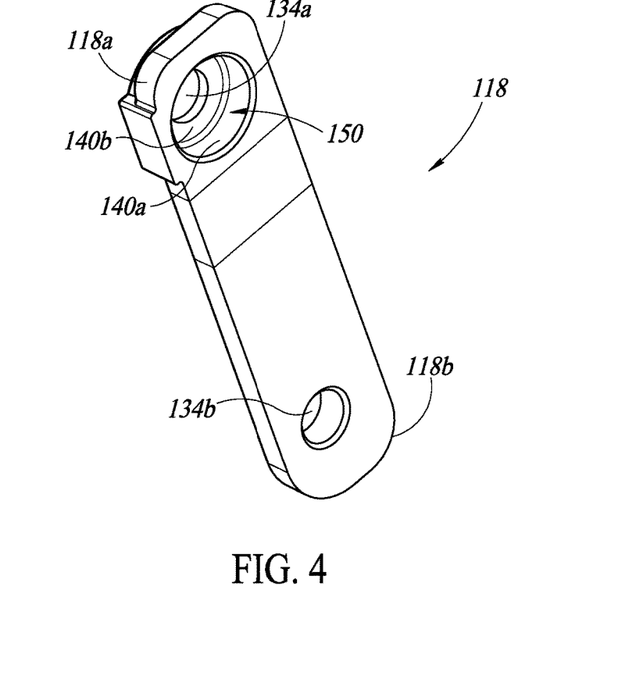
FIG. 4 is an enlarged perspective view of the linking member of FIG. 3.

Referring to FIGS. 3, 4 and 5, in some embodiments, the inner sections 126 of each of the horizontal vanes 110a, 110b, are pivotably connected to a shared linking member 118, by inner pivot pins 154a, to link the horizontal vanes 110a, 110b together at the respective inner sections 126. The linking member 118 floats, or otherwise, moves transversely relative to the longitudinal pivot axes X1, X2, in response the horizontal vanes 110a, 110b being pivoted about the longitudinal pivot axes X1, X2.

As best seen in FIG. 4, in some embodiments, the linking member 118 can be a rectangular shaped structure with rounded corners, and can include a first end portion 118a, having a first receiving aperture 134a, and a second end portion 118b, having a second receiving aperture 134b. The first receiving aperture 134a can receive, and pivotably retain, a first inner pivot pin 154a of the upper horizontal vane 110a, to pivotably connect the upper horizontal vane 110a, to the linking member 118. The second receiving aperture 134b can receive, and pivotably retain, a second inner pivot pin 154b of the lower horizontal vane 110b, to pivotably connect the lower horizontal vane 110b to the linking member 118.

In some embodiments, the diameter of the receiving aperture 134b may be equal, or substantially equal, to the diameter of the receiving aperture 134a. Also, a circular cavity 150, having a larger diameter than the receiving aperture 134a, may be formed on an inward facing surface of first end portion 118a of the linking member 118. The circular cavity 150 can have an interior sidewall 140a, and circular cavity base wall 140b, with the first receiving aperture 134a being formed in the base wall 140b.

Figure 7:
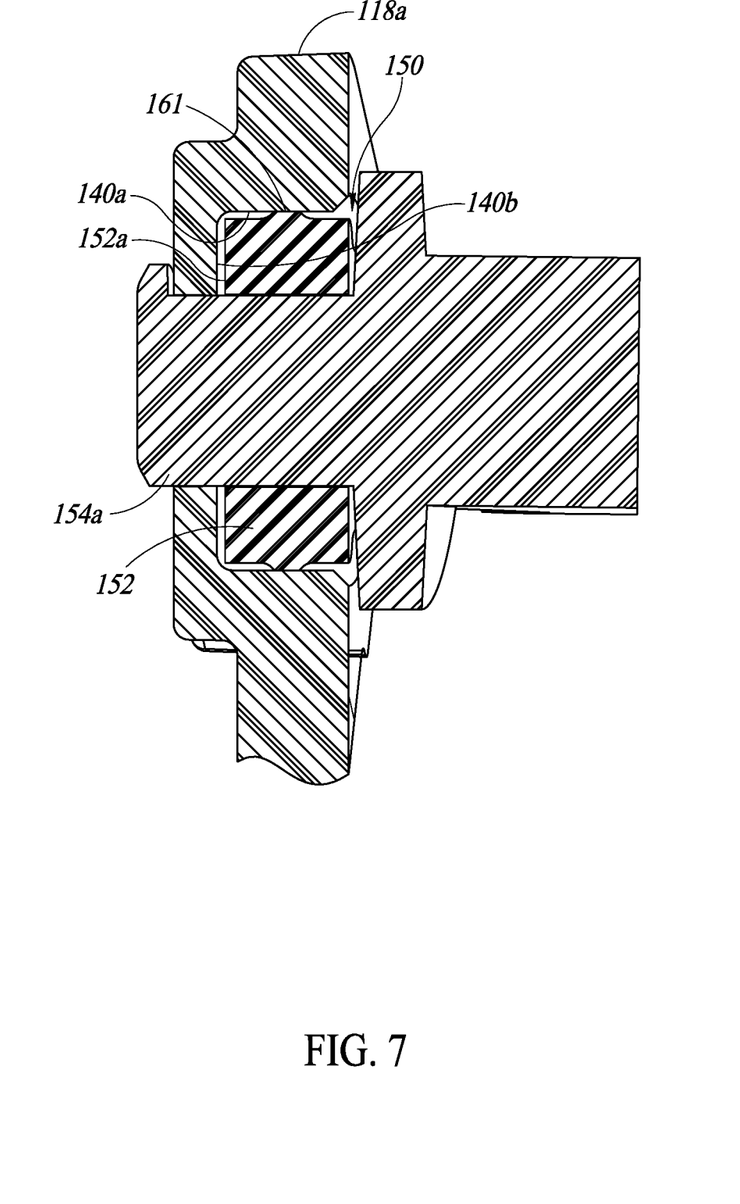
FIG. 7 is a partial cross-sectional side elevation view of the inner pivot pin of the upper horizontal vane, disposed within the annular grommet of FIG. 5, and as coupled to the linking member, according to some embodiments.

As can be seen in FIGS. 4, 5 and 7, in some embodiments, a resilient compressible (e.g., elastic) annular grommet 152 can be disposed about the inner pivot pin 154a of the upper horizontal vane 110a, and the annular grommet 152 can be snugly disposed within the circular cavity 150 of the linking member 118, so that a first side wall 152a of the annular grommet 152 is abutted against, or adjacent to, the cavity base wall 140b. Moreover, with the annular grommet 152 disposed within the circular cavity 150, a circumferential perimeter portion 158 of the annular grommet 152 is compressed against the cylindrical sidewall 140a of the circular cavity 150, as can be seen in FIG. 7. As such, when a user pivot adjusts the horizontal vanes 110a, 110b about the longitudinal axes X1, X2, in the direction "P," to impart an angle of pivot "D" (see, e.g., FIGS. 2a, 2b, and 3), the shared linking member 18 connected to the inner sections of the horizontal vanes 110a, 110b, will necessarily be transversely displaced, such as, for example, in a direction generally illustrated by arrow "U," (see, e.g., FIG. 3). Also, the inner pivot pins 154a, 154b, will pivot in the direction "P" relative to the linking member 18, such that the annular grommet 152 will rotate relative to the circular cavity 150, and/or the inner pivot pin 154a (as discussed further below), generating friction, and the compression of the annular grommet 152 can contribute to the friction. The friction will, in turn, generate effort against pivot adjustment of the horizontal vanes 110a, 110b. The effort generated will contribute to quality feel for a user adjusting the vanes 110a, 110b, using knob 13, and will also help counterbalance against forward dropping tendency of the inner (forward) section 126 of the horizontal vanes 110a, 110b, during bumpy rides or exposure of the horizontal vanes to high heat in the air register 104. As discussed further below, in some embodiments, the annular grommet 152 is structured to favor, or otherwise result in, rotation of the annular grommet 152 relative to the sidewall 140a of the circular cavity 150, as opposed to rotation of the inner pivot pin 154a, relative to an inner surface 156 of the annular grommet, when the horizontal vanes 110a, 110b are pivotally adjusted.

Notably, in the illustrated embodiment, although inner pivot pin 154a of the upper horizontal vane 110a is coupled to linking member 118 via annular grommet 152, the other inner pivot pin 154b of the lower horizontal vane 110b can be directly connected to the linking member 118, without the use of an intervening grommet structure. In addition, in other embodiments, even when there are more than two (2) horizontal vanes 110a, 110b, etc., linked together by the shared linking member 118, a single annular grommet 152 disposed on single inner pivot pin of such horizontal vanes, 110a, 110b, etc., such as on inner pivot pin 154a, can provide the desired effort generation for all of the plurality of horizontal vanes, 110a, 110b, etc. Also, although the discussion herein regarding the use of the annular grommet 152 is focused on use of such annular grommet in a linking member for horizontal vanes, the use of such annular grommet 152 relative other pivot pins of vanes, or differently oriented vanes, can also provide effort generation.

Figure 6A:
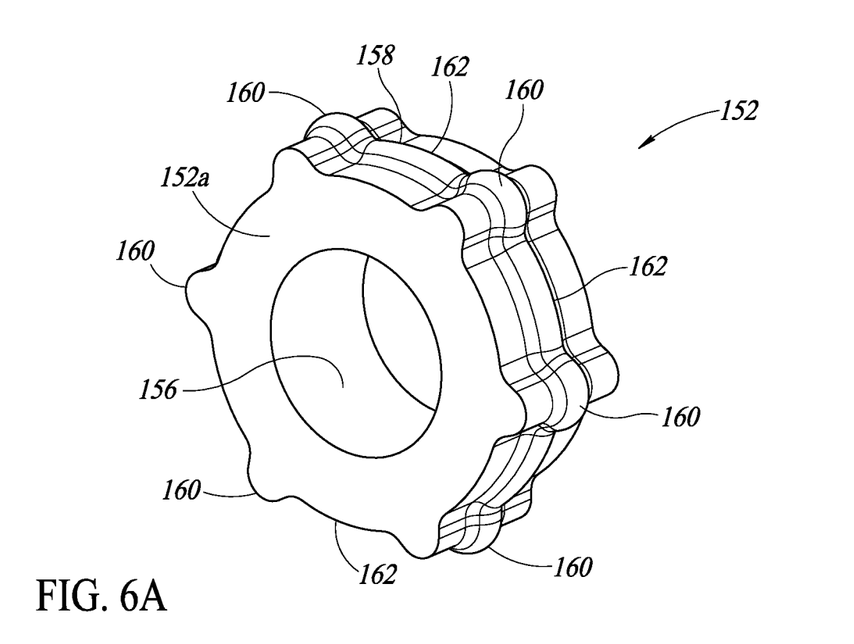
FIGS. 6a and 6b are enlarged perspective views of the annular grommet of FIG. 5, with FIG. 6b showing example contact surface sections of the annular grommet, for some embodiments of the present disclosure.

Referring to FIG. 6a, in some embodiments, an outer perimeter portion 158, of the annular grommet 152, has an undulating surface, including radially protruding members, or crests 160, separated by troughs 162. In the illustrated embodiment, the distance between two consecutive radially protruding members 160, is a circumferential length of a trough 162, and each of the radially protruding members 160 formed on the perimeter surface 158 can be equally spaced apart by such repeating troughs 162. In the illustrated, non-limiting embodiment, six (6) radially protruding members 160 are shown, with one of six (6) troughs 162 situated between each of the radially protruding members 160, while in other embodiments, more than six (6), or less than six (6), radially protruding members 160 and respective intervening troughs 162 are formed on the annular grommet 152.

Figure 6B:
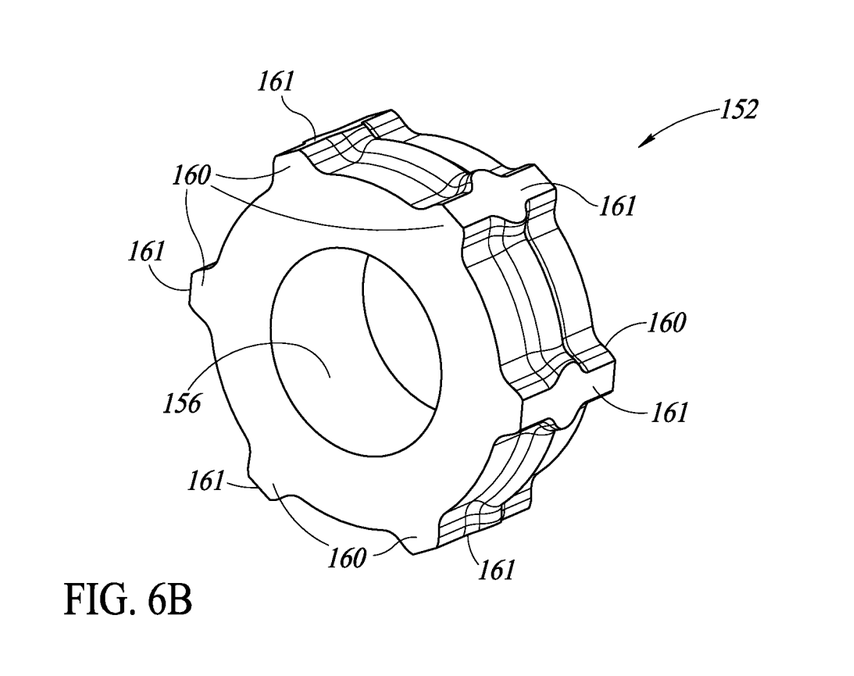

As best seen in FIGS. 6b, and 7, the perimeter portion 158 of the annular grommet 152 can be compressed by contact with the sidewall 140a of the circular cavity 150 of the linking member 118 (as described above). During such compression, total contact surface area of the perimeter portion 158 which contacts the sidewall 140a can consist of, or include, an aggregate of separate contact surface sections 161 on outer portions of the radially protruding members 160 (the contact surface sections 161 are illustrated by flattened surfaces in FIG. 6b to represent compression), which are separated by sections of the perimeter portion 158 which are not in contact with the sidewall 140a (e.g., the troughs 162, and base portions of the radially protruding members 160). As such, the total contact surface area is less than a total surface area of the perimeter portion 158. By contrast with the perimeter portion 158, which has radially protruding members 160 to promote fragmentation of contact surface area, the interior surface 156 of the annular grommet 152 can be formed with a smooth, non-undulating surface, configured to achieve substantially complete surface contact with a sidewall 155 the first inner pivot pin 154a. That is, an interior contact surface area between the interior surface 156 of the annular grommet 152 and the sidewall 155 of the first inner pivot pin 154a, can be equal to, or substantially equal to, a total surface area of the interior surface 156. In some embodiments, the interior contact surface area is greater than 0.15 square centimeters ($cm^2$). In other embodiments, such interior contact surface area is 0.18 $cm^2$, between 0.1-0.3 $cm^2$, greater than 0.1 $cm^2$, greater than 0.18 $cm^2$, or less than 0.3 $cm^2$.

In some embodiments, an aggregate of the contact surface area sections 161 of the perimeter portion 158 of the annular grommet 152, is about 0.05 $cm^2$, between 0.03-0.1 $cm^2$, greater than 0.05 $cm^2$, less than 0.1 $cm^2$, or less than 0.07 $cm^2$.

In some embodiments, an aggregate of the contact surface area sections 161 of the perimeter portion 158 of the annular grommet 152 is less than 30% of the total surface area of the interior surface 156 of the annular grommet 152, or less than 60% of the total surface area of the interior surface 156. As discussed above, the undulating form of the perimeter portion 158 of the annular grommet 152 helps reduce total contact surface area between the perimeter portion 158 and the sidewall 140a of the cavity 150, in comparison with the total surface area of the inner surface 156 of the annular grommet 152 that contacts the inner pivot pin 154a, and this structure favors, or otherwise results in, rotation of the annular grommet 152 relative to the sidewall 140a of the circular cavity 150, as opposed to rotation of the inner pivot pin 154a, relative to an inner surface 156 of the annular grommet, when the horizontal vanes 110a, 110b are pivotally adjusted. The annular grommet 152 can be constructed of any of a number of suitable resilient or elastomeric materials, such as, for example, without limitation, a silicone rubber compound.

In some embodiments of the present disclosure, an assembly, comprises a housing, at least two vanes, each vane including an outer section and an inner section, and each outer section having a longitudinal pivot axis extending through the outer section. The outer sections are each pivotably anchored to the housing for pivot movement about the respective longitudinal pivot axes. Also, a shared linking member is pivotably connected to an inner pivot pin of each of the inner sections of the at least two vanes, and at least one of the inner pivot pins is disposed within a grommet.

In one embodiment of the assembly, only one of the inner pivot pins is disposed within a grommet, and the other of the pivot pins is directly connected to the shared linking member.

In one embodiment of the assembly, each of the outer sections of the at least two vanes are pivotably anchored to the housing by an outer pivot pin connected to a retainer of the housing.

In one embodiment of the assembly, a perimeter portion of the grommet is disposed within a cavity of the linking member, and only a part of the surface of the perimeter portion is in contact with a sidewall of the cavity.

In one embodiment of the assembly, the grommet comprises a plurality of radially protruding members. Also, in one embodiment of the assembly, the radially protruding members are evenly spaced apart on a perimeter portion of the grommet. In one embodiment of the assembly, a plurality of contact surface sections of the radially protruding members is in contact with a sidewall of a cavity of the linking member, and a total contact surface area of the contact surface sections is less than a total surface area of the perimeter portion.

In one embodiment, the total contact surface area of the contact surface sections is less than 60% of a total interior contact surface area between an interior surface of the grommet and a sidewall of the at least one of the inner pivot pins.

In one embodiment, the total contact surface area of the contact surface sections is less than 30% of a total interior contact surface area between an interior surface of the grommet and a sidewall of the at least one of the inner pivot pins.

In some embodiments of the present disclosure, an assembly, comprises an air register positioned adjacent a vehicle dashboard, the air register having at least two horizontal vanes, with each horizontal vane having an outer section, and with at least one of the outer sections having an outer edge that is substantially aligned with an outer edge surface of an adjacent bezel of the vehicle dashboard. Also, each horizontal vane of the at least two horizontal vanes includes an outer longitudinal pivot axis extending through the outer section of the horizontal vane, and the outer sections are each pivotably anchored to a housing of the air register to be pivotable about the outer longitudinal pivot axes. Moreover, each horizontal vane of the at least two horizontal vanes includes an inner section having an inner pivot pin, with each of the inner pivot pins being pivotably connected to a shared linking member that links the at least two horizontal vanes together, and with the linking member being transversely displaceable in response to the at least two horizontal vanes being pivoted about the outer longitudinal pivot axes. Also, at least one of the inner pivot pins is disposed within an annular grommet.

In one embodiment, a material of construction for the annular grommet is an elastomer, and in one embodiment, a material of construction for the annular grommet is a silicone rubber compound.

In one embodiment, a perimeter surface of the annular grommet includes radially protruding members. In one embodiment, the radially protruding members are compressed within a cavity of the linking member.

In one embodiment, a total contact surface area between the radially protruding members and the linking member is less than 60% of a total interior contact surface area between an interior surface of the annular grommet and a sidewall of the at least one of the inner pivot pins. Also, in one embodiment, a total contact surface area between the radially protruding members and the linking member is less than 30% of a total interior contact surface area between an interior surface of the annular grommet and a sidewall of the at least one of the inner pivot pins.

In one embodiment, a total contact surface area between the radially protruding members and the linking member is less than 0.1 $cm^2$, and a total interior contact surface area between an interior surface of the annular grommet and a sidewall of the at least one of the inner pivot pins is greater than 0.1 $cm^2$.

In one embodiment, only one of the inner pivot pins is disposed within an annular grommet.

In some embodiments, a method comprises assembling an air register including pivotably connecting a plurality of horizontal vanes to an air register housing in a manner to permit each of the plurality of horizontal vanes to pivot about an outer pivot axis extending longitudinally across the horizontal vane at an outer section of the horizontal vane. The method also includes linking an inner section of each of the plurality of horizontal vanes together using a shared linking member by pivotably connecting a first inner pivot pin of at least one of the horizontal vanes to an annular grommet and to the linking member, and pivotably connecting a second inner pivot pin of at least one of the horizontal vanes to the linking member. The linking member is free to move transversely relative to the outer pivot axes in response to the horizontal vanes being pivoted about the outer pivot axes.

In one embodiment, the method comprises compressing a perimeter portion of the annular grommet within a cavity of the linking member. Also, in one embodiment, the method comprises contacting circumferentially spaced apart sections of the annular grommet by a cylindrical sidewall of the cavity, while providing circumferential gaps without contact between the spaced apart sections.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An assembly, comprising:
a housing;
at least two vanes, each vane including an outer section and an inner section, each outer section having a longitudinal pivot axis extending through the outer section, wherein the outer sections are each pivotably anchored to the housing for providing pivot movement about the respective longitudinal pivot axes; and
a shared linking member pivotably connected to an inner pivot pin of each of the inner sections of the at least two vanes, and wherein at least one of the inner pivot pins is disposed within a grommet, wherein the grommet comprises a plurality of radially protruding members.

2. The assembly of claim 1, wherein only one of the inner pivot pins is disposed within a grommet, and the other of the inner pivot pins is directly connected to the shared linking member.

3. The assembly of claim 1, wherein each of the outer sections of the at least two vanes is pivotably anchored to the housing by an outer pivot pin connected to a retainer of the housing.

4. The assembly of claim 1, wherein a perimeter portion of the grommet is disposed within a cavity of the linking member, and wherein only a part of the surface of the perimeter portion is in contact with a sidewall of the cavity.

5. The assembly of claim 1, wherein the radially protruding members are evenly spaced apart on a perimeter portion of the grommet.

6. The assembly of claim 1, wherein a plurality of separate contact surface sections of the radially protruding members is in contact with a sidewall of a cavity of the linking member, and wherein a total contact surface area of the contact surface sections is less than a total surface area of the perimeter portion.

7. The assembly of claim 6, wherein the total contact surface area of the contact surface sections is less than 60% of a total interior contact surface area between an interior surface of the grommet and a sidewall of the at least one of the inner pivot pins.

8. The assembly of claim 6, wherein the total contact surface area of the contact surface sections is less than 30% of a total interior contact surface area between an interior surface of the grommet and a sidewall of the at least one of the inner pivot pins.

9. An assembly, comprising:
an air register positioned on a vehicle dashboard, the air register having at least two horizontal vanes, each horizontal vane having an outer section, with at least one of the outer sections having an outer edge that is substantially aligned with an outer edge surface of a bezel of the vehicle dashboard;
wherein each horizontal vane of the at least two horizontal vanes includes an outer longitudinal pivot axis extending through the outer section of the horizontal vane, and wherein the outer sections are each pivotably anchored to a housing of the air register for pivot movement about the outer longitudinal pivot axes;
wherein each horizontal vane of the at least two horizontal vanes includes an inner section having an inner pivot pin, each of the inner pivot pins being pivotably connected to a shared linking member that links the at least two horizontal vanes together, with the linking member being transversely displaceable in response to the at least two horizontal vanes being pivoted about the outer longitudinal pivot axes; and
wherein at least one of the inner pivot pins is disposed within an annular grommet, wherein the grommet comprises a plurality of radially protruding members.

10. The assembly of claim 9, wherein a material of construction for the annular grommet is a silicone rubber compound.

11. The assembly of claim 9, wherein the radially protruding members are compressed within a cavity of the linking member.

12. The assembly of claim 11 wherein a total contact surface area between the radially protruding members and the linking member is less than 60% of a total interior contact surface area between an interior surface of the annular grommet and a sidewall of the at least one of the inner pivot pins.

13. The assembly of claim 11 wherein a total contact surface area between the radially protruding members and the linking member is less than 30% of a total interior contact surface area between an interior surface of the annular grommet and a sidewall of the at least one of the inner pivot pins.

14. The assembly of claim 11 wherein a total contact surface area between the radially protruding members and the linking member is less than 0.1 $cm^2$, and a total interior contact surface area between an interior surface of the annular grommet and a sidewall of the at least one of the inner pivot pins is greater than 0.1 cm².

15. The assembly of claim 9 wherein only one of the inner pivot pins is disposed within the annular grommet.

16. A method, comprising:
   assembling an air register including:
   pivotably connecting a plurality of horizontal vanes to an air register housing in a manner to permit each of the plurality of horizontal vanes to pivot about an outer pivot axis extending longitudinally across the horizontal vane at an outer section of the horizontal vane;
   linking an inner section of each of the plurality of horizontal vanes together using a shared linking member by pivotably connecting a first inner pivot pin of at least one of the plurality of horizontal vanes to an annular grommet and to the linking member, and pivotably connecting a second inner pivot pin of at least one of the plurality of horizontal vanes to the linking member, wherein the linking member moves transversely relative to the outer pivot axes in response to the horizontal vanes being pivoted about the outer pivot axes; and
   contacting circumferentially spaced apart sections of the annular grommet by a cylindrical sidewall of the cavity while providing circumferential gaps between the spaced apart sections that are not in contact with the cylindrical sidewall.

17. The method of claim 16, further comprising compressing a perimeter portion of the annular grommet within a cavity of the linking member.

\* \* \* \* \*